US008612561B2

(12) United States Patent
Ni

(10) Patent No.: US 8,612,561 B2
(45) Date of Patent: Dec. 17, 2013

(54) VIRTUAL NETWORK STORAGE SYSTEM, NETWORK STORAGE DEVICE AND VIRTUAL METHOD

(75) Inventor: Xiaoke Ni, Hangzhou (CN)

(73) Assignee: Hangzhou H3C Technologies Co., Ltd., Hangzhou, Zhejiang Province (CN)

(*) Notice: Subject to any disclaimer, the term of this patent is extended or adjusted under 35 U.S.C. 154(b) by 570 days.

(21) Appl. No.: 12/278,906

(22) PCT Filed: Sep. 4, 2006

(86) PCT No.: PCT/CN2006/002278
§ 371 (c)(1),
(2), (4) Date: Aug. 8, 2008

(87) PCT Pub. No.: WO2007/101375
PCT Pub. Date: Sep. 13, 2007

(65) Prior Publication Data
US 2009/0043878 A1    Feb. 12, 2009

(30) Foreign Application Priority Data
Mar. 8, 2006  (CN) .......................... 2006 1 0057320

(51) Int. Cl.
G06F 15/173    (2006.01)
(52) U.S. Cl.
USPC ........................................ 709/223
(58) Field of Classification Search
USPC ............................................. 709/223; 711/6
See application file for complete search history.

(56) References Cited

U.S. PATENT DOCUMENTS

| 6,757,778 | B1 |  | 6/2004 | van Rietschote |
| 6,857,057 | B2 | * | 2/2005 | Nelson et al. .................. 711/203 |
| 6,880,052 | B2 | * | 4/2005 | Lubbers et al. ............... 711/162 |
| 6,920,494 | B2 | * | 7/2005 | Heitman et al. .............. 709/223 |
| 6,948,039 | B2 | * | 9/2005 | Biessener et al. ............. 711/162 |
| 6,948,044 | B1 | * | 9/2005 | Chandrasekaran ........... 711/203 |
| 7,363,457 | B1 | * | 4/2008 | Dekoning et al. ............ 711/170 |
| 7,379,990 | B2 | * | 5/2008 | Tsao ............................. 709/223 |
| 7,584,272 | B2 | * | 9/2009 | Spry ............................. 709/220 |
| 7,606,239 | B2 | * | 10/2009 | Maveli et al. ................. 370/398 |
| 7,752,392 | B1 | * | 7/2010 | Roy et al. ...................... 711/118 |
| 7,840,723 | B1 | * | 11/2010 | Kemkar .......................... 710/36 |

(Continued)

FOREIGN PATENT DOCUMENTS

| CN | 1467957 | 1/2004 |
| CN | 1474275 | 2/2004 |

(Continued)

*Primary Examiner* — Douglas Blair
*Assistant Examiner* — Benjamin Ailes
(74) *Attorney, Agent, or Firm* — Workman Nydegger

(57) ABSTRACT

A virtual network storage system includes at least two network storage devices which connect to same SAN. At least one network storage device includes a device management unit for maintaining the mapping relationship between the global volume and the local volume of each network storage device, and for redirecting the access from the global volume to the network storage device which the global volume management unit of the global volume is located. At least one network storage device includes a global volume management unit for executing the access operation to the global volume according to the mapping relationship. A network storage device and virtual method are applied to the virtual network storage system. With the increasing of the network device, the ability of processing the access to the global volume is increased, and then the performance bottleneck caused by virtually operating to the network storage system.

5 Claims, 5 Drawing Sheets

(56) References Cited

U.S. PATENT DOCUMENTS

| | | | |
|---|---|---|---|
| 7,865,588 B2* | 1/2011 | Hayden et al. | 709/223 |
| 2003/0101239 A1 | 5/2003 | Ishizaki | |
| 2003/0115432 A1 | 6/2003 | Biessener et al. | |
| 2003/0131182 A1* | 7/2003 | Kumar et al. | 711/5 |
| 2003/0236945 A1 | 12/2003 | Nahum | |
| 2004/0088297 A1* | 5/2004 | Coates et al. | 707/10 |
| 2004/0225719 A1 | 11/2004 | Kisley et al. | |
| 2005/0044199 A1 | 2/2005 | Shiga et al. | |
| 2005/0080923 A1* | 4/2005 | Elzur | 709/238 |
| 2005/0172097 A1 | 8/2005 | Voigt et al. | |
| 2005/0259632 A1* | 11/2005 | Malpani et al. | 370/351 |
| 2005/0261063 A1 | 11/2005 | Boyd et al. | |
| 2006/0031594 A1 | 2/2006 | Kodama | |
| 2006/0041559 A1 | 2/2006 | Baldwin et al. | |
| 2006/0085522 A1* | 4/2006 | Spry | 709/220 |
| 2007/0088810 A1* | 4/2007 | Lamb et al. | 709/223 |
| 2008/0140906 A1* | 6/2008 | Serizawa et al. | 711/6 |
| 2008/0215793 A1* | 9/2008 | Hashimoto et al. | 711/6 |
| 2009/0100163 A1* | 4/2009 | Tsao | 709/223 |
| 2010/0180078 A1* | 7/2010 | Satoyama et al. | 711/114 |

FOREIGN PATENT DOCUMENTS

| | | |
|---|---|---|
| CN | 1540524 | 10/2004 |
| CN | 1642169 | 7/2005 |
| CN | 1662903 | 8/2005 |
| EP | 06775595.9 | 2/2011 |
| JP | 10003440 | 1/1998 |
| JP | 10307783 | 11/1998 |
| JP | 2003208267 | 7/2003 |
| JP | 2003337722 | 11/2003 |
| JP | 2006024215 | 1/2006 |
| RU | 2302034 | 10/2005 |
| RU | 2008134481 | 9/2010 |
| RU | 2008134481 | 3/2011 |

\* cited by examiner

VIRTUAL NETWORK STORAGE SYSTEM, NETWORK STORAGE DEVICE AND VIRTUAL METHOD

FIELD OF THE INVENTION

The invention relates to the virtualization of storage area systems, and in particular to a virtualized network storage system, a network storage device applied to the virtualized network storage system and a method for virtualization thereof.

BACKGROUND OF THE INVENTION

Network storage devices supporting Internet Small Computer System Interface (iSCSI) have gradually come into the recognition of users in the market. In the low to middle end market, a network storage device, usually provided with a physical storage medium, is a device integrated with functions and storage medium. Such a network storage device generally has a capacity below about 10 TB (Tera-Byte). With the increase of user's requirements, a plurality of such network storage devices are needed to form a larger storage space.

To enable an accessing client to utilize the plurality of network storage devices contiguously by using a same access address, the network storage devices need to be virtualized. FIG. 1 illustrates a commonly used structure of a virtualized iSCSI network storage system and the accessing clients thereof in the prior art. As shown in FIG. 1, a storage server is connected to an exchange which connects the accessing clients and network storage devices.

In FIG. 1, a local volume management unit in a network storage device utilizes a local volume to represent a physical storage medium in the network storage device, and provides an access function to the local volume. The local volume may be either a physical volume or a logical volume, depending on the functions of the network storage device and the specific configurations of a user. The storage server performs an in-band virtualization to the network storage devices, manages the local volumes of all of the network storage devices in a centralized manner, and maps the local volumes into a global volume so that the local volumes may be accessed by the clients via one IP address. The global volume is a logical volume. The access to the global volume by an accessing client is done via the storage server. The storage server decomposes the access to the global volume into accesses to the local volumes of one or more network storage devices, and combines the results of the accesses to the local volumes returned from the one or more network storage devices to form a result of the access to the global volume.

However, with the increasingly enlargement of the storage space required and the increase of the network storage devices in the network storage system, the processing capability and connection bandwidth of the storage server may become a bottleneck of the whole network storage system since the storage server alone is responsible for all the read and write operations, thereby decreasing the efficiency of the access to the network storage system.

SUMMARY OF THE INVENTION

A problem to be solved by the invention is the bottleneck problem of system performance due to the fact that a storage server of a virtualized network storage system is in charge of all the access to global volume in the prior art.

A virtualized network storage system according to the invention may include at least two network storage devices connected to a same storage area network (SAN), wherein at least one of the network storage devices may include a device management unit adapted to maintain a mapping relationship between global volume and local volumes of the network storage devices, and redirect an access to a global volume to a network storage device at which a global volume management unit of the global volume is located;

at least one of the network storage devices may include a global volume management unit adapted to execute an access to a global volume according to the mapping relationship between global volume and local volumes.

Alternatively, when more than one of the network storage devices comprise device management units, one of the device management units functions as a primary device management unit, and is adapted to redirect an access to a global volume and synchronize the mapping relationship between global volume and local volumes which is stored on network storage devices at which the device management units or a global volume management unit is located; the other of the device management units function as backup device management units, when the primary device management unit has a fault, one of the backup device management units may be upgraded to be a new primary device management unit.

Alternatively, at least one global volume is provided with a primary global volume management unit adapted to execute an access to the at least one global volume and at least one backup global volume management unit, when the primary global volume management unit has a fault, one of the at least one backup global volume management unit may be upgraded to be a new primary global volume management unit;

when a primary-backup switching between the global volume management units occurs, the network storage device redirect the access to the at least one global volume to the current primary global volume management unit.

Another virtualized network storage system according to the invention may include at least two network storage devices connected to a same Storage Area Network (SAN), wherein each of the network storage devices may include a device management unit and a global volume management unit, the device management units are adapted to exchange status information of the network storage devices with each other; one of the device management units functions as a primary device management unit, and is adapted to synchronize a mapping relationship between global volume and local volumes which is stored on network storage devices and redirect an access to a global volume to a network storage device at which a global volume management unit of the global volume is located; the other of the device management units function as backup device management units, when the primary device management unit has a fault, one of the backup device management units may be upgraded to be a new primary device management unit;

the global volume management units are adapted to execute an access to a global volume according to the mapping relationship between global volume and local volumes.

Alternatively, the status information exchanged between the network storage devices may include loading parameters of the network storage devices;

the primary device management unit is further adapted to select a global volume management unit of a network storage device as the global volume management unit of an accessed global volume according to the loading parameters.

Alternatively, the global volume management unit of the accessed global volume and local volumes having a mapping relationship with the accessed global volume are on a same network storage device.

Alternatively, the network storage devices employ Internet Small Computer System Interface (iSCSI) protocol, a network storage device at which the primary device management unit is located has a virtual network address for receiving the access to the global volume, the redirection of the access to the global volume is implemented by iSCSI redirect protocol.

Alternatively, each of the network storage devices may further include a data access management unit, adapted to function as a communication interface for local volume accessing between different network storage devices, forward and receive an access request to local volumes located on different network storage devices sent from a global volume management unit and a result of the access request according to a predefined protocol.

Alternatively, the mapping relationship between global volume and local volumes is implemented by an embedded database.

A virtualized network storage device for use in a virtualized network storage system according to the invention may include a device management unit adapted to exchange working information of the virtualized network storage system with other device management units, redirect an access to a global volume to a network storage device adapted to execute the access to the global volume; wherein the working information may include a mapping relationship between global volume and local volumes in the virtualized network storage system.

Alternatively, the network storage device may further include a global volume management unit, adapted to execute an access to a global volume according to the mapping relationship between global volume and local volumes.

Alternatively, the working information of the virtualized network storage system may include loading parameters of network storage devices;

the network storage device adapted to execute the access to the global volume may be determined according to current loading parameters of the network storage devices.

Alternatively, the network storage device employs Internet Small Computer System Interface (iSCSI) protocol;

the network storage device has at least two Internet Protocol, IP, addresses, one of the IP addresses is a virtual IP address of the network storage system for a first access to a global volume in the network storage system; the other of the IP addresses is an IP address of the network storage device itself for subsequent accesses to the global volume after an iSCSI protocol redirection.

Alternatively, the network storage device may further include a data access management unit adapted to forward and receive an access request to local volumes located on different network storage devices sent from the global volume management unit and a result of the access request according to a predefined protocol.

Another virtualized network storage device for use in a virtualized network storage system according to the invention may include a device management unit and a global volume management unit, wherein the device management unit is adapted to exchange working information of the virtualized network storage system with other device management units in the virtualized network storage system; the working information may include a mapping relationship between global volume and local volumes on the device management units; and the global volume management unit is adapted to execute an access to a global volume according to the mapping relationship between global volume and local volumes.

Alternatively, the network storage device may further include a data access management unit adapted to forward and receive an access request to local volumes located on different network storage devices sent from the global volume management unit and a result of the access request.

Alternatively, the working information of the virtualized network storage system may include loading parameters of the network storage devices.

A third network storage device for use in a virtualized network storage system according to the invention may include a global volume management unit, adapted to execute an access to a global volume according to a mapping relationship between global volume and local volumes.

A third virtualized network storage system according to the invention may include a storage management apparatus and at least two network storage devices, wherein the storage management apparatus is adapted to maintain a mapping relationship between global volume and local volumes of the network storage devices, and redirect an access to a global volume to a network storage device at which a global volume management unit of the global volume is located;

at least one of the network storage devices may include a global volume management unit adapted to execute an access to a global volume according to the mapping relationship between global volume and local volumes.

Alternatively, each of the network storage devices may further include a data access management unit adapted to function as a communication interface for local volume accessing between different network storage devices, forward and receive an access request to local volumes located on different network storage devices sent from a global volume management unit and a result of the access request according to a predefined protocol.

A method for virtualization of a network storage system including at least two network storage devices is provided according to the invention. The method may include:

determining one of the at least two network storage devices as a primary network storage device;

when receiving an access to a global volume, redirecting, by the primary network storage device, the access to the global volume to a network storage device in charge of the access to the global volume; and executing, by the network storage device in charge of the access to the global volume, access operations to the global volume according to a mapping relationship between global volume and local volumes of the network storage devices.

Alternatively, the method may further include: synchronizing, by the primary network storage device, the mapping relationship between global volume and local volumes which is stored on the network storage devices.

Alternatively, the method may further include: exchanging, by the network storage devices, working status information with each other; and the method may further include: determining one of the other network storage devices to take over the work of the primary network storage device when the primary network storage device has a fault.

Alternatively, the working status information may include loading parameters of the network storage devices;

before redirecting by the primary network storage device the access to the global volume, the method may further include: designating, by the primary network storage device, a network storage device in charge of the access to the global volume according to the loading parameters, if there is no network storage device in charge of the access to the global volume currently.

Alternatively, the network storage devices employ Internet Small Computer System Interface (iSCSI) protocol;

the primary network storage device has a virtual IP address of the network storage system for receiving an access to a global volume in the network storage system;

determining one of the other network storage devices to take over the work of the primary network storage device when the primary network storage device has a fault may include: configuring the virtual IP address, originally configured on the primary network storage device, on the network storage device taking over the work of the primary network storage device.

Alternatively, executing by the network storage device in charge of the access to the global volume the access operations to the global volume may include:

decomposing the access to the global volume into access to at least one local volume according to the mapping relationship between global volume and local volumes;

sending a local volume accessing request to a network storage device at which the at least one local volume is located; and combining results of the access to the at least one local volume into a result of the access to the global volume, and returning the result of the access to the global volume.

In the invention, the global volume management units for processing the access to global volumes are distributed over network storage devices, so that the capability for processing the access to the global volumes may be increased with the increasing of the number of network storage devices, thereby preventing the forming of a performance bottleneck due to the virtualization of the network storage system.

In addition, in the invention, the device management units may also be distributed over the network storage devices, so that the reliability of the virtualized network storage system may be improved through the redundancy between the device management units and the global volume management units.

Furthermore, the network storage system in the invention may exclude a storage server, thereby simplifying the network structure and reducing the cost for construction, maintenance and management of the network storage system.

DETAILED DESCRIPTION OF THE EMBODIMENTS

During the virtualization of a network storage system, the local volumes of network storage devices in the network storage system need to be mapped into global volume(s), so that an accessing client may access the whole storage space via the global volume(s). On which network storage device (the physical storage medium of which network storage device) the data is stored is transparent to the accessing client. When accessing a virtualized network storage space, the most burdensome work is to decompose the access to a global volume into the access to one or more network storage devices and combine the results of the access to the one or more network storage devices into a result of the access to the global volume.

In the prior art, a storage space is usually expanded by adding new network storage device(s), since the amount of physical storage medium contained in one network storage device is limited. However, it is hard to expand the processing capacity and occupied bandwidth of a storage server in synchronization with the expansion of the storage space, which has an impact on the performance of the system. In the invention, the access to a global volume is distributed over multiple network storage devices, so that the access processing capacity and bandwidth of the system may be improved with the expansion of the storage space.

A network storage device according to the invention may include a local volume management unit and a physical storage medium. Similar to those in the prior art, the physical storage medium may provide a physical storage space for storing data, and the local volume management unit may provide access to the physical storage medium via local logical volumes or local physical volumes.

Figure 1:
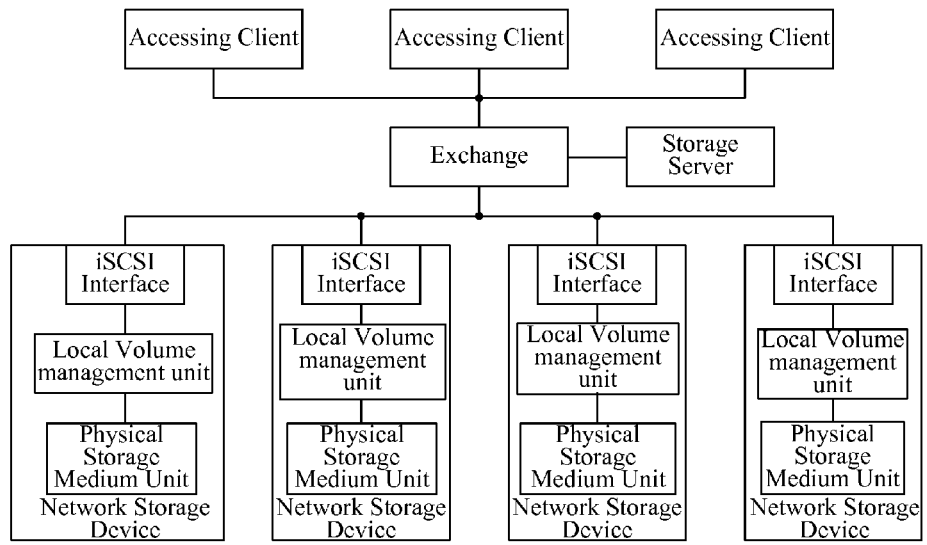
FIG. 1 is a schematic diagram illustrating the structure of a virtualized network storage system and the accessing clients in the prior art.
Figure 2:
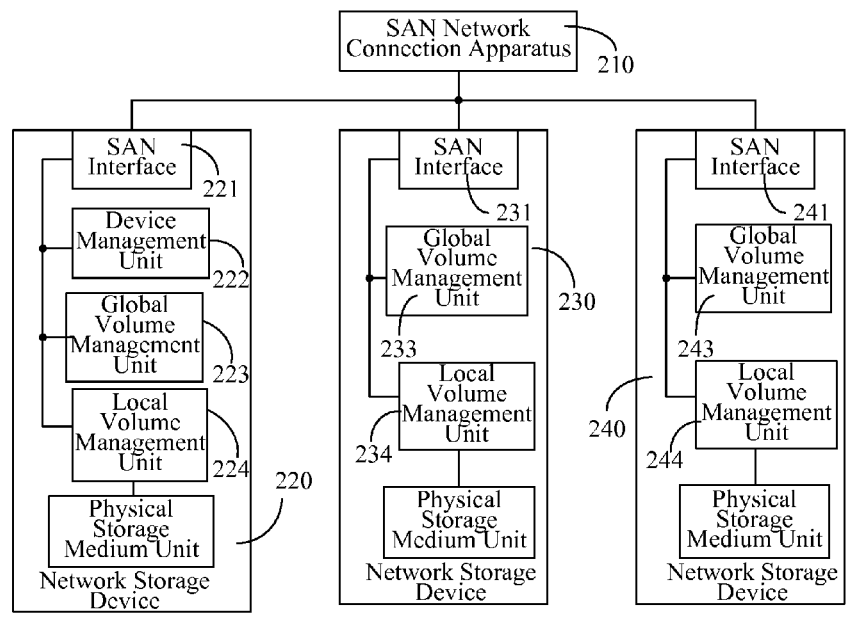
FIG. 2 is a schematic diagram illustrating the structure of a virtualized network storage system according to a first embodiment of the invention.

FIG. 2 is a schematic diagram illustrating the structure of a virtualized network storage system according to the invention. In the virtualized network storage system, network storage devices 220, 230 and 240 are connected with each other via a SAN network connection apparatus 210. An accessing client may access the virtualized network storage system via the SAN network connection apparatus 210. The network storage device 220 includes a SAN interface 221, a device management unit 222, a global volume management unit 223 and a local volume management unit 224, which are interconnected with each other. The network storage device 230 includes a SAN interface 231, a global volume management unit 233 and a local volume management unit 234, which are interconnected with each other. The network storage device 240 includes a SAN interface 241, a global volume management unit 243 and a local volume management unit 244, which are interconnected with each other. Each network storage device includes a physical storage medium connected with local volume management unit of the network storage device.

In the network storage system according to the embodiment, only the network storage device 220 has a device management unit, i.e. the device management unit 222. A user may configure and manage the whole network storage system via the device management unit 222. The configuration and management of the whole network storage system may include the creation of global volume(s) and the formation of mapping relationship between the global volume(s) and the local volumes. In addition, the device management unit 222 may send the mapping relationship to all other network storage devices (e.g. the network storage devices 230 and 240 in this embodiment) having a global volume management unit, except the network storage device at which the device management unit 222 is located, and may update the mapping relationship on the network storage devices 230 and 240 in real time when the mapping relationship between the global volume(s) and the local volumes changes.

The access to a global volume of the network storage system is firstly processed by the network management unit 222. The network management unit 222 redirects the access to the global volume to a global volume management unit in charge of the access to the global volume.

In the network storage system, the access to each global volume is under the charge of a global volume management unit. Different global volumes may be under the charge of a same global volume management unit. However, one global volume is usually under the charge of only one global volume management unit at a time, to prevent possible write and read conflict and interlocking of resources. A global volume management unit may be specified for the global volume, or may be created automatically for the global volume according to preset selection conditions. Alternatively, a global volume management unit may be dynamically determined by the device management unit 222 according to the running conditions of the system and the conditions of the access to the global volume.

The device management unit 222 may redirect the access to a global volume by use of different methods, depending on the protocols employed by the network storage system. For example, the address of a network storage device at which a global volume management unit in charge of the global volume may be returned to an accessing client initiating the access to the global volume. The accessing client may directly send an access request to the network storage device.

A global volume management unit may perform an access operation, in response to the access to a global volume under the charge of this global volume management unit. For example, supposing an accessed global volume is under the charge of the global volume management unit 233, when receiving an access request to the global volume, the global volume management unit 233 decomposes the access to the global volume into the access to one or more local volumes according to the mapping relationship between the global volume and the local volumes of the network storage system stored on the network storage device 230. The local volumes to be accessed may be located on different network storage devices. Supposing the local volumes corresponding to the storage region of this access to the global volume are located on the network storage devices 230 and 240, the global volume management unit 233 sends an access request to the local volume management unit 234, and to the local volume management unit 244 via the SAN interface 231, the SAN network connection apparatus 210 and the SAN interface 241 of the network storage device 240. The local volume management units 234 and 244 respectively perform the access operations to the local volumes, and return results of the access operations to the local volumes to the global volume management unit 233 sending the access request. The global volume management unit 233 combines the results of the access operations to the local volumes into a result of the access to the global volume, return the result of the access to the global volume to the accessing client initiating the access to the global volume.

The result of the access to the global volume may be returned via different return paths according to the protocols employed by the SAN network and the particular implementations. A relatively simple path is that the result of the access to the global volume is directly sent by the global volume management unit to the accessing client.

In the case of assigning a global volume management unit for a global volume, a primary global volume management unit and a backup global volume management unit may be assigned for the global volume. When the primary global volume management unit has a fault, the backup global volume management unit may handle the access operations to the global volume. In the case of automatically generating global volume management units and dynamically determining a global volume management unit for a global volume according to a preset condition, if no limitation is configured for a global volume management unit, each global volume management unit may serve as a backup of other global volume management unit.

Figure 3:
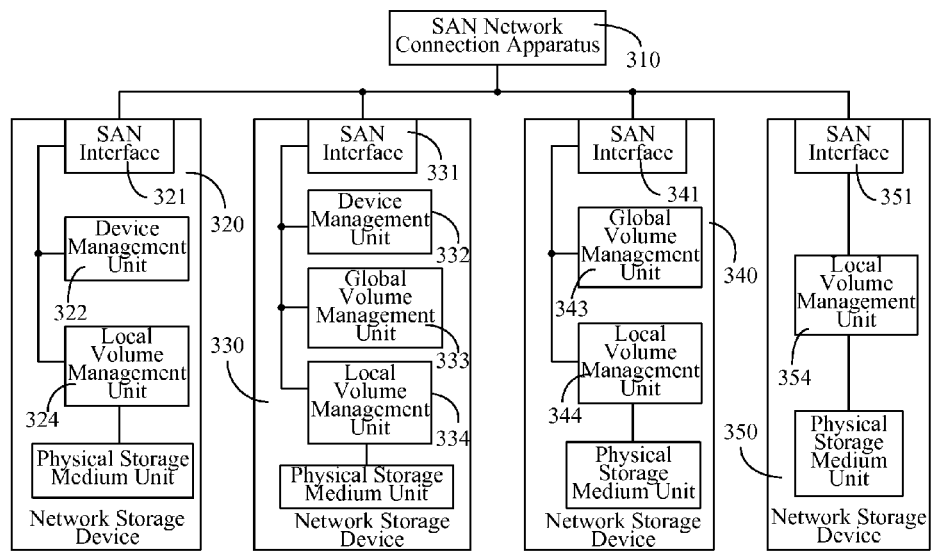
FIG. 3 is a schematic diagram illustrating the structure of a virtualized network storage system according to a second embodiment of the invention.

In the first embodiment as shown above, only one device management unit is provided, which is prone to become a fault point of the network storage system. In the second embodiments as shown in FIG. 3, network storage devices 320, 330, 340 and 350 are connected with each other via a SAN network connection apparatus 310. The network storage device 320 includes a SAN interface 321, a device management unit 322 and a local volume management unit 324, which are connected with each other. The network storage device 330 includes a SAN interface 331, a device management unit 332, a global volume management unit 333, and a local volume management unit 334, which are connected with each other. The network storage device 340 includes a SAN interface 341, a global volume management unit 343, and a local volume management unit 344, which are connected with each other. The network storage device 350 includes a SAN interface 351, and a local volume management unit 354, which are connected with each other. Each network storage device includes a physical storage medium connected to the local volume management unit of the network storage device.

The second embodiment is different from the first embodiment in that, a plurality of device management units are provided, and not all of the network storage devices are provided with a global volume management unit.

When a network storage system includes a plurality of device management units, one device management unit may function as a primary device management unit responsible for configuration and management of the network storage system, maintenance of mapping relationship between global volume(s) and local volumes, synchronization and redirection of the access to global volume(s). The synchronization refers to the synchronization of the mapping relationship between global volume(s) and local volumes with the network storage device(s) including a global volume management unit or other device management unit(s). The other device management unit(s) may serve as backup device management unit(s). When the primary device management unit has a fault, a backup device management unit takes over the work of the primary device management unit. Similar to a primary-backup switching system of high availability, the primary device management unit and the backup device management unit(s) exchange information of working statuses with each other, so that the backup device management unit(s) may obtain the working status of the primary device management unit in time.

In the case of more than one backup device management unit, which device management unit may be chosen to take over the work of the primary device management unit may be determined based on preset priorities or may be determined by selection among all the backup device management units based on a certain algorithm. The two methods may be implemented by a variety of techniques utilized in the existing multi-backup systems and trunk systems, and are not repeated herein.

In the embodiment, each of the network storage devices 320 and 330 includes a device management unit. Supposing the device management unit 332 is a primary device management unit, then the device management unit 322 functions as a backup device management unit. During normal operation, if the mapping relationship between global volume(s) and local volumes changes, the primary device management unit 332 notifies the change of the mapping relationship to the network storage device 320 including the backup device management unit 322 and the network storage device 340 including the global volume management unit 343, to synchronize the mapping relationship between global volume(s) and local volumes on the network storage devices 320, 330 and 340. In this way, the backup device management unit 322 is able to take over the work of the primary device management unit 332 at any time required, and the global volume management unit 343 may correctly parse the access to a global volume.

The network storage device 350 does not store the mapping relationship between global volume(s) and local volumes since the network storage device 350 is not provided with a device management unit or a global volume management unit. In addition, since the network storage devices 320 and 350 are not provided with a global volume management unit, the local volumes on these two network storage devices have to be accessed via the global volume management unit 333 or 343 on the network storage devices 330 and 340.

Similar to the first embodiment, the global volume management units in the second embodiment may backup for each other, to improve the availability of the network storage system.

Figure 4:
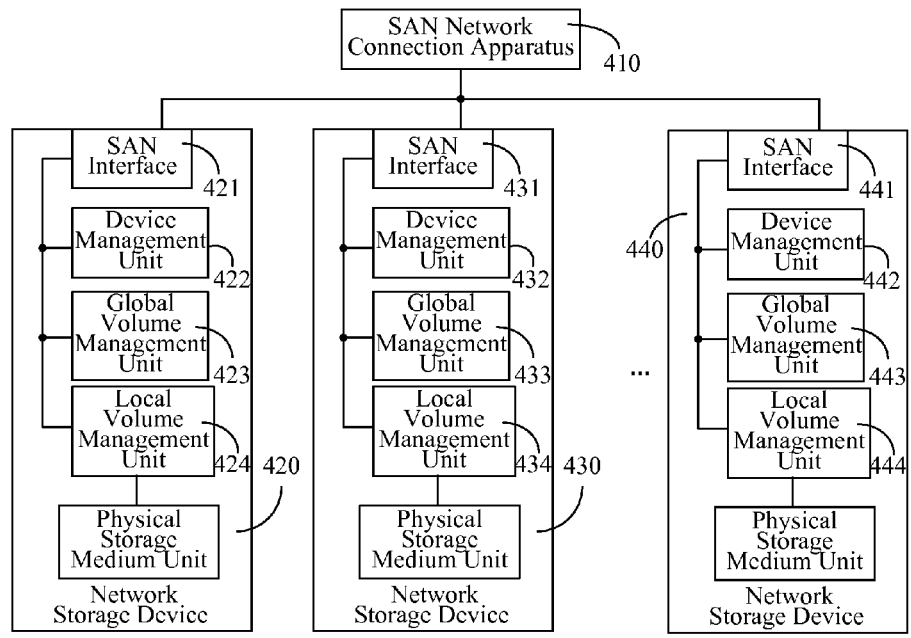
FIG. 4 is a schematic diagram illustrating the structure of a virtualized network storage system according to a third embodiment of the invention.

FIG. 4 illustrates the structure according to a third embodiment which is a preferred embodiment of the invention. Network storage devices 420, 430, and 440 are connected with each other via a SAN network connection apparatus 410. An accessing client may access the virtualized network storage system via the SAN network connection apparatus 410. The network storage device 420 includes a SAN interface 421, a device management unit 422, a global volume management unit 423 and a local volume management unit 424, which are connected with each other. The network storage device 430 includes a SAN interface 431, a device management unit 432, a global volume management unit 433, and a local volume management unit 434, which are connected with each other. The network storage device 440 includes a SAN interface 441, a device management unit 442, a global volume management unit 443, and a local volume management unit 444, which are connected with each other. Each network storage device includes a physical storage medium connected to the local volume management unit of the network storage device.

In the third embodiment, each network storage device includes a device management unit and a global volume management unit. Therefore, the device management units may exchange status information with each other since the backup device management units are required to detect the working status of the primary device management unit. In addition, since a global volume management unit is provided on each network storage device, a working load parameter of the network storage device including the network storage device may be inserted into the status information to be exchanged between the device management units, so that a global volume management unit may be determined for an accessed global volume according to the working load parameter. In this way, a dynamic load balancing may be achieved in the network storage system, in addition to the unified accessing space provided to the accessing clients. A user may choose an appropriate operation parameter, such as availability of a processor, availability of network bandwidth, or the combination thereof, as the working load parameter of the network storage devices according to the particular application environment.

In addition, when determining a global volume management unit for an accessed global volume, the global volume management unit of the network storage device at which the local volumes having a mapping relationship with the accessed global volume may be chosen preferentially. In this way, when the global volume management unit processes the access to the local volumes, a part of operations may be performed on the same network storage device, thereby improving the efficiency of the access to the global volume.

Supposing the iSCSI protocol is employed in the network storage system as shown in FIG. 4, an example of a possible implementation of the network storage system is shown below to illustrate the operation flow of the network storage system in the embodiment in detail.

When the network storage system starts, a primary device management unit is selected among the device management units of the network storage devices according to a preset priority condition based on trunk techniques. Without loss of generality, supposing the device management unit 422 is selected as the primary device management unit, the network storage device 420 then has a virtual IP (Internet Protocol) address of the virtualized network storage system, in addition to the IP address of the network storage device 420.

After the primary device management unit 422 is selected, the user may manage the local volumes on the network storage devices in a unified manner, plan and configure the storage space of the whole network storage system in the manner of global volume, via the primary device management unit 422. The primary device management unit 422 is in charge of the maintenance of global information of the whole network storage system. The user may configure and manage, over an administrative console, the network storage system by using the virtual IP address of the network storage system as a destination address. The configuration and management may be received and executed by the primary device management unit 422.

Figure 5:
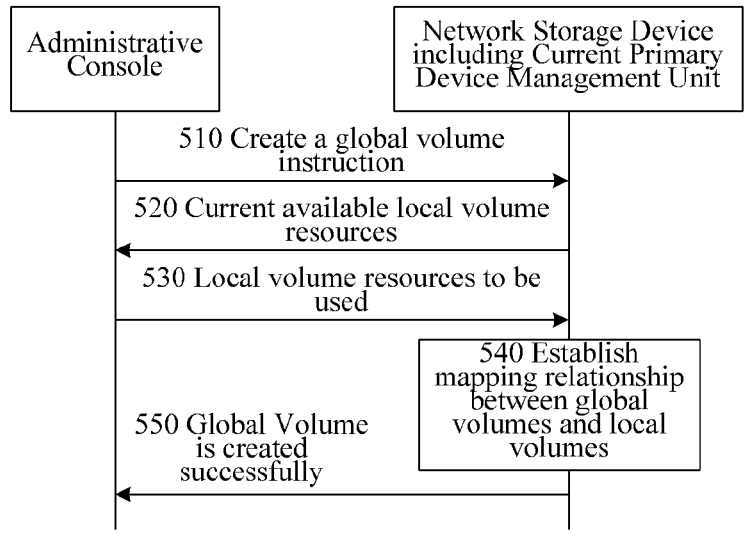
FIG. 5 is a flow chart illustrating the process of creating a global volume by a virtualized network storage system according to the third embodiment of the invention.

For example, FIG. 5 shows a flow chart illustrating the process of creating a global volume over an administrative console. Reference may be made to FIG. 5 and FIG. 4:

In steps 510-520, the administrative console sends an instruction of creating a global volume, by using the virtual IP address of the network storage system as the destination address. When receiving the instruction, the primary device management unit 422 returns the currently available local volumes in the network storage system to the administrative console. Alternatively, the primary device management unit 422 may select the resources of local volumes according to a certain rule and provide the selected local volumes to the user.

In steps 530-550, the user determines the local volumes to be used over the administrative console, and notifies the primary device management unit 422. The primary device management unit 422 establishes the mapping relationship between the newly created global volume and the local volumes to be used, and returns to the administrative console a message indicating the successful creation of the global volume.

An example of possible mapping relationship between global volumes and local volumes is shown in the following table:

| Global Volume | | | Local Volume | | | |
|---|---|---|---|---|---|---|
| Number | Global Volume Identification | Others | Network Storage Device Identification | ACSL | Size | Others |
| 1 | 1 | | No_420 | 1,0,0,0 | 100M | |
| 2 | 1 | | No_430 | 1,0,1,0 | 50M | |
| 3 | 2 | | No_430 | 1,0,1,0 | 100M | |
| 4 | 2 | | No_440 | 1,0,0,0 | 100M | |

In the above table, network storage device identification may be used to locate, for a local volume, a particular network storage device in the network storage system. The network storage devices may be numbered, and the number may be used as network storage device identification. Alternatively, an existing parameter which may distinguish the network storage devices from each other, such as IP address, may be used as network storage device identification. The table of mapping relationship may be implemented by running an embedded database on each network storage device, to improve the speed of querying the table of mapping relationship. In the above table, ACSL (Adapter/Channel/SCSI/LUN (Logical Unit Number)) refers to SCSI identification.

The primary device management unit 422 is responsible for maintaining the same mapping relationship between global volume(s) and local volume(s) on each of the network storage devices. In this way, the backup device management units 432 and 442 may takes over the work of the primary device management unit 422 at any time. In addition, and each of the global volume management units is able to process the access to a global volume independently.

The primary device management unit 422 and the backup device management units 432 and 442 may exchange status information, including the working load parameters, of the network storage devices with each other by using a heartbeat signal.

Figure 6:
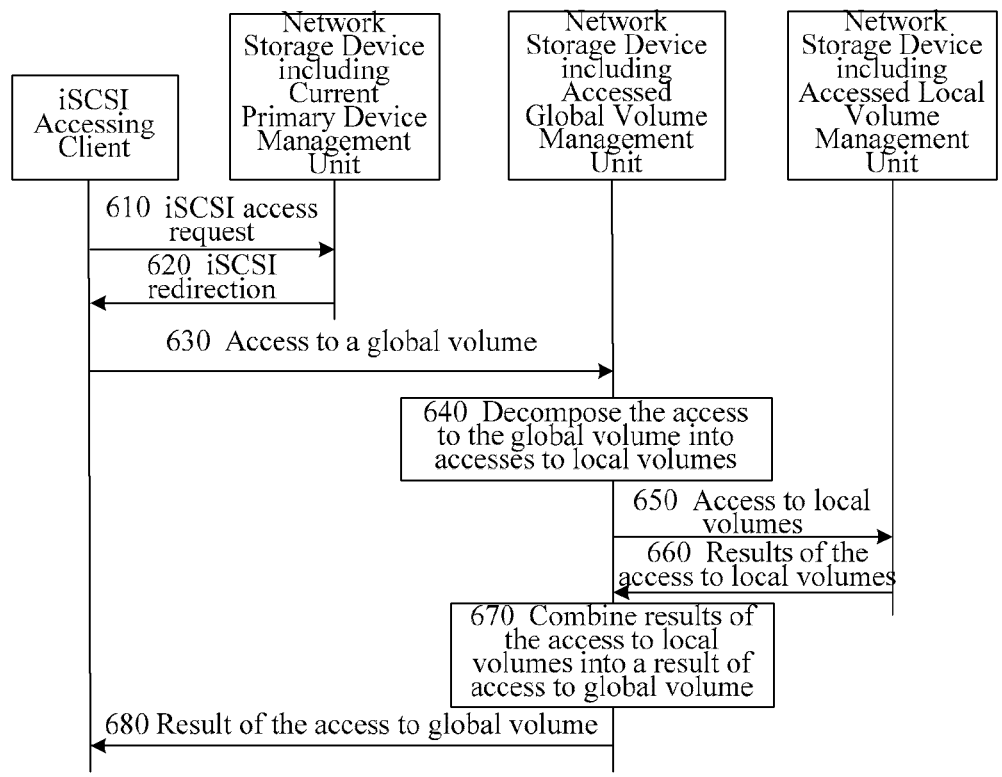
FIG. 6 is a flow chart illustrating the process of accessing a global volume via a virtualized network storage system according to the third embodiment of the invention.

FIG. 6 is a flow chart illustrating the process of accessing a global volume via a virtualized network storage system by an iSCSI accessing client. Reference may be made to FIG. 6 and FIG. 4.

In steps 610-620, the accessing client sends an iSCSI access request, by using the virtual IP address of the network storage system as the destination address. When receiving the iSCSI access request, if there is no determined local volume management unit for an accessed global volume, the primary device management unit 422 determines a global volume management unit for the accessed global volume according to the working load parameters of the network storage devices 430 and 440 received from the backup device management units 432 and 442 and the working load parameter of the network storage device 420.

Supposing the global volume management unit 433 is in charge of the accessed global volume, the primary device management unit 422 notifies, by using an iSCSI redirect protocol notification, the accessing client that the subsequent destination device of iSCSI protocol is the global volume management unit 433.

In steps 630-640, the accessing client sends a global volume access request over the iSCSI protocol to the IP address of the network storage device 430. The global volume management unit 433 decomposes the access to the global volume into access to corresponding local volumes according to a table of mapping relationship between global volume(s) and local volumes.

In steps 650-660, supposing the local volumes to be accessed are on the network storage devices 420 and 430, the global volume management unit 433 sends a local volume access request to the local volume management unit 434, and to the local volume management unit 424 via the SAN interface 431. The local volume management units 434 and 424 return results of the access to the local volumes back to the global volume management unit 433.

In steps 670-680, the global volume management unit 433 combines the results of the access to the local volumes returned from the local volume management units 434 and 424 into a result of the access to the global volume, and sends the result of the access of the global volume to the accessing client. In this way, the access to the global volume is finished. The iSCSI protocol may be employed for transmission of the local volume access request and the results of access between the global volume management unit and the local volume management units.

If the network storage device 420 has a fault and the backup device management units 432 and 442 discover that the heartbeat signal from the original primary device management unit 422 is lost, a new primary device management unit is selected according to the preset priority condition to take over the work of the device management unit 422. In addition, the virtual IP address of the network storage system is configured at the network storage device at which the new primary device management unit is located.

The local volume access request and the results of access are transmitted within the network storage system, and the network storage devices are interconnected via an exchange so that the relationship therebetween is relatively simple. Some operations, such as application, authentication, and connection, in the iSCSI protocol may be omitted. A simplified protocol may be applied to the implementation of the access to local volumes. For example, the data transmission section of the standard iSCSI protocol may be employed, or a protocol borne over IP network may be defined, for transmission of the local volume access request and returned result.

Figure 7:
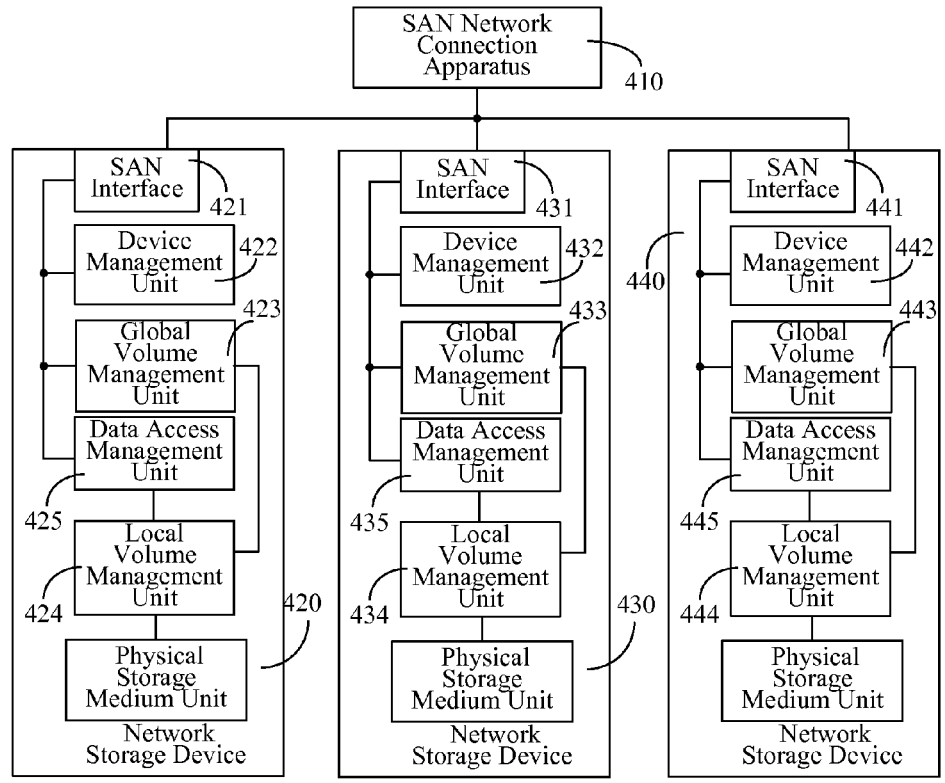
FIG. 7 is a schematic diagram illustrating the structure of a virtualized network storage system according to the third embodiment of the invention when the system utilizes a simplified local volume access protocol.

In the case of the simplified protocol, a data access management unit is required to be added in each network storage device as shown in FIG. 4. FIG. 7 illustrates the structure of a data access management unit. A data access management unit is interconnected with the SAN interface, the device management unit and the global volume management unit in the network storage device at which the data access management unit is located, and is connected with the local volume management unit in the network storage device. The local volume management unit is connected with the global volume management unit and the physical storage medium in the network storage device respectively.

Supposing a global volume managed by the global volume management unit 443 is accessed, by querying the mapping relationship between global volume(s) and local volumes, it is determined that the local volumes to be accessed are located on the network storage devices 440 and 430. For the local volumes on the same network storage device 440, the global volume management unit 443 may obtain the result of access via the local volume management unit 444.

For the local volumes on the network storage device 430, the global volume management unit 443 may send an access request for the local volumes on the network storage device 430 to the data access management unit 445 first. The data access management unit 445 sends the access request to the network storage device 430 via the SAN interface 441 by using the simplified protocol. When receiving the access request transmitted over the simplified protocol, the data access management unit 435 converts the access request into a data access instruction executable by the local volume management unit 434 and sends the data access instruction to the local volume management unit 434. After receiving an execution result returned from the local volume management unit 434, the data access management unit 435 returns the execution result to the network storage device 440 via the SAN interface 431 by using the simplified protocol. The data access management unit 445 receives the execution result transmitted over the simplified protocol, converts the result into an access result that can be parsed by the global volume management unit 443, and sends the access result to the global volume management unit 443.

As can be seen, the data access management units 425, 435 and 445 provides network transmission interface for the access operations to local volumes located on different network storage devices, so as to implement the access to data within the network storage system by using the simplified protocol, thereby improving the efficiency of local volume access.

For the network storage device at which the primary device management unit is located as shown in the second or third embodiment, the primary device management unit exchanges working information of the virtualized network storage system with other network storage devices, including synchronizing the mapping relationship between global volume(s) and local volumes in the virtualized network storage system. The working information may further include the working load parameters of the network storage devices, to be used by the primary device management unit to determine which device management unit is in charge of the access operations to a global volume.

The primary device management unit may be further adapted to redirect the access to a global volume to a network storage device adapted to execute the access operations to the global volume. The network storage device at which the primary device management unit is located may include a global volume management unit adapted to execute the access operations to the global volume according to the mapping relationship between global volume(s) and local volumes.

If the network storage devices are iSCSI devices, the network storage device at which the primary device management unit is located is provided with at least two IP addresses. One is the virtual IP address of the network storage system, adapted to be used for the first access to a global volume by an accessing client over the iSCSI protocol. The other is the IP address of the network storage device itself, adapted to be used for the subsequent accesses to the global volume by the accessing client over the iSCSI protocol after the redirection over the iSCSI protocol. The IP address of the network storage device itself may also be used by the global volume management units on the other network storage devices to access the local volumes on this network storage device. In addition, a data access management unit may be added to a network storage device which employs a simplified protocol for local volume accessing. The data access management unit may be adapted to forward an access request for local volumes on other network storage devices from the global volume management unit according to a predefined protocol, and forward a received access result to the global volume management unit according to the predefined protocol. The data access management unit may be further adapted to receive an access request for local volumes on the network storage device at which the data access management unit is located according to a predefined protocol, and return, according to the predefined protocol, an access result to the party sending the request.

For a network storage device at which a backup device management unit is located as shown in the second or third embodiment, the backup device management unit exchanges working information of the virtualized network storage system with other network storage devices. The working information may include the mapping relationship between global volume(s) and local volumes, and the working load parameters of the network storage devices. The network storage device may further include a global volume management unit adapted to execute the access operations to a global volume according to the mapping relationship between global volume(s) and local volumes. The network storage device at which the backup device management unit is located may include a data access management unit if the network storage device employs a simplified protocol for local volume accessing. The functions of the data access management unit are similar to those of the network storage device at which the primary device management unit, and are not described herein.

Figure 8:
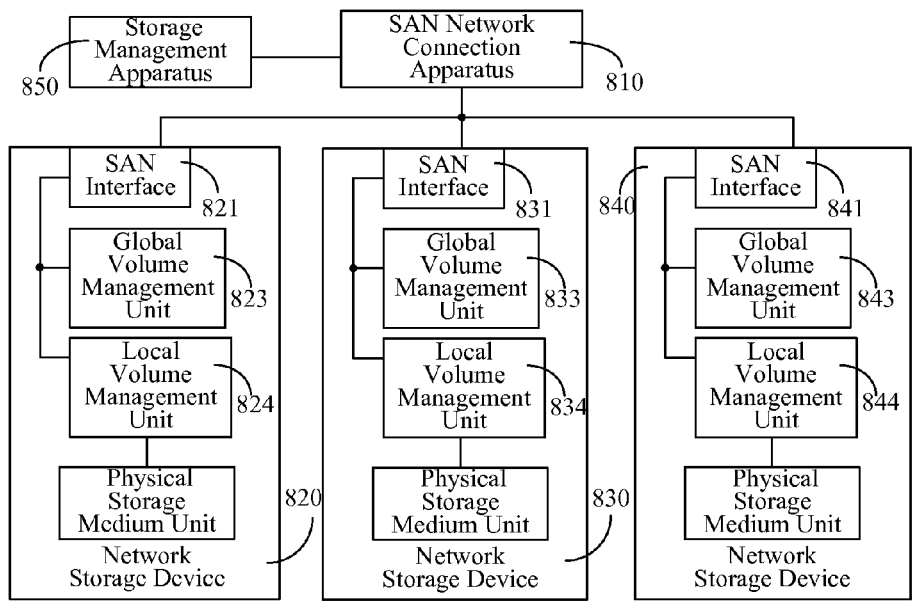
FIG. 8 is a schematic diagram illustrating the structure of a virtualized network storage system according to a fourth embodiment of the invention.

FIG. 8 is a schematic diagram illustrating the structure of a fourth embodiment of the invention. Network storage devices 820, 830, and 840 are connected with each other via a SAN network connection apparatus 810. A storage management apparatus 850 is also connected to the SAN network connection apparatus 810. An accessing client may access the virtualized network storage system via the SAN network connection apparatus 810. The network storage device 820 includes a SAN interface 821, a global volume management unit 823 and a local volume management unit 824, which are connected with each other. The network storage device 830 includes a SAN interface 831, a global volume management unit 833, and a local volume management unit 834, which are connected with each other. The network storage device 840 includes a SAN interface 841, a global volume management unit 843, and a local volume management unit 844, which are connected with each other. Each network storage device includes a physical storage medium connected to the local volume management unit of the network storage device.

The difference of the fourth embodiment lies in that the storage management apparatus 850 is added to implement the functions of the device management units on the network storage devices in the first, second and third embodiments. In other words, the storage management apparatus 850 is adapted to maintain the mapping relationship between global volume(s) and local volumes on the network storage devices including the global volume management units, determine a global volume management unit for an accessed global volume, and redirect the access to the global volume to the network storage device at which the determined global volume management unit is located.

Similar to the first, second and third embodiments, the global volume management unit implements the access to the global volume by using the mapping relationship between global volume(s) and local volumes.

The access operations to the global volume are also distributed over multiple network storage devices. The storage management apparatus 850 are required to only maintain the mapping relationship and redirect an access. Accordingly, the working load of the storage management apparatus 850 is limited. In the embodiment, the performance bottleneck of the network storage system can also be avoided. In addition, the storage management apparatus 850 may employ the primary-backup technique or the trunk technique to achieve high reliability.

In the fourth embodiment, each network storage device may also include a data access management unit (not shown). The data access management unit may function as a communication interface for local volume accessing with different network storage devices, to forward and receive, according to a predefined protocol, an access request for local volumes on different network storage devices sent from the global volume management unit and the access results.

Figure 9:
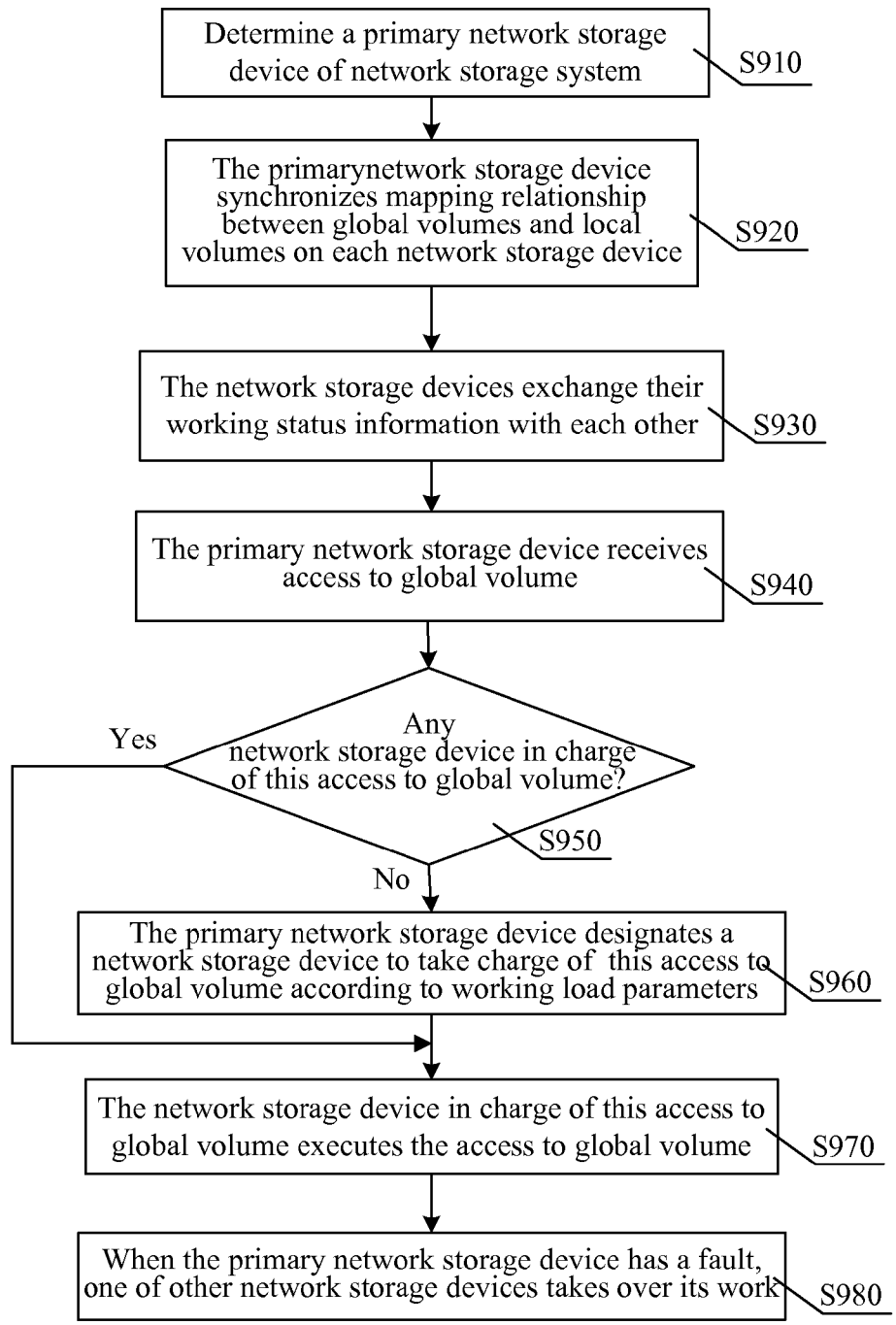
FIG. 9 is a flow chart illustrating a method for virtualization of a network storage system according to the invention.

FIG. 9 is a flow chart illustrating a method for virtualization of a network storage system according to the invention. The network storage system includes more than two network storage devices. In step S910, one of the network storage devices is determined to be the primary network storage device. For a network storage system having only one device management unit, the network storage device at which the device management unit is located is determined as the primary network storage device. For a network storage system having multiple device management units, the network storage device at which the primary device management unit is located is determined as the primary network storage device.

In step S920, the primary network storage device synchronizes the mapping relationship between global volume(s) and local volumes on the network storage devices. The mapping relationship between global volume(s) and local volumes in the network storage system is configured and modified by the primary network storage device. When the mapping relationship changes, the primary network storage device makes the other network storage devices synchronize with this change in real time. The step S920 may be executed only when the mapping relationship between global volume(s) and local volumes changes.

In step S930, the network storage devices exchange working status information with each other.

In step S940, the primary network storage device receives an access request to a global volume in the network storage system. Taking a network storage system using the iSCSI protocol as an example, the network storage system may provide a virtual IP address to an accessing client. The virtual IP address may be configured on the primary network storage device. When the accessing client initiates the access to a global volume, the first access to the global volume is received by the primary network storage device.

In step S950, the primary network storage device judges whether there is any network storage device in charge of the access to the global volume. If there is a network storage device in charge of the access to the global volume, the process proceeds to step S970. Otherwise, the process proceeds to step S960.

In step S960, the primary network storage device designates a network storage device to take charge of the access to the global volume according to working load parameters in the working status information in the network storage devices.

In step S970, the network storage device in charge of the access to the global volume executes the access to the global volume according to the mapping relationship between global volume(s) and local volumes.

Firstly, the network storage device in charge of the access to the global volume decomposes the access to the global volume into access to one or more local volumes according to the mapping relationship between global volume(s) and local volumes. Then the network storage device in charge of the access to the global volume sends the access to the one or more local volumes to the network storage device(s) at which the one or more local volumes are located. On receiving the local volume access request, the network storage devices execute the access operations to the local volumes and return to the requesting party results of the access operations. The network storage device in charge of the access to the global volume combines the results of the access operations to the local volumes accessing into a result of the access to the global volume, and returns the result of the access to the global volume to the accessing client initiating the access to the global volume.

In step S980, when the primary network storage device can not work normally due to a fault, the other network storage devices may know that the failure of the primary network storage device via working status information exchanged therebetween. At this time, one of the other network storage devices is upgraded to be the primary network storage device, and takes over the work of the failed network storage device.

In an iSCSI network storage system, when a network storage device is upgraded to be primary network storage device, the virtual IP address of the network storage system is configured on this network storage device, so that this network storage device may receive the first access to a global volumes from an accessing client.

As can be seen with reference to the above four embodiments, when only one device management unit is provided in a network storage system and a network storage device is designated in advance to be in charge of the access of the global volumes, steps S830, S950 to S970 may be omitted.

In the above four embodiments, the access to global volumes in a network storage system are distributed over network storage devices each including a global volume management unit, so that the capability for processing the access to the global volumes may be increased with the increasing capacity of the network storage system. In addition, in the invention, since the hardware architecture and connection manner of the existing network storage system need not to be changed and the invention may be implemented by software on the network storage devices, multiple ordinary network storage devices may be integrated together in an efficient manner. In this way, the redundancy and reliability of the system may be improved while providing storage capacity. In the former three embodiments, a prior art storage server is omitted in the network storage system according to the invention. In this way, the network structure is simplified, and it is relatively easy to manage the network storage system, thereby reducing the cost for construction, and maintenance of the network storage system.

The particular embodiments as described above should not be construed as a limit to the protection scope of the invention. Any modification, equivalent substitution and improvement made within the spirit and scope of the invention should be compassed within the protection scope defined by the following claims.

What is claimed is:

1. A virtualized network storage system, comprising at least two network storage devices connected to a same Storage Area Network, SAN, wherein each of the network storage devices comprises a device management unit and a global volume management unit, the device management units are adapted to exchange status information of the network storage devices with each other; one of the device management units functions as a primary device management unit, and is adapted to synchronize a mapping relationship between global volume and local volumes which is stored on network storage devices and redirect an access to a global volume to a network storage device at which a global volume management unit of the global volume is located; the other of the device management units function as backup device management units, when the primary device management unit has a fault, one of the backup device management units may be upgraded to be a new primary device management unit;

the global volume management units are adapted to execute an access to a global volume according to the mapping relationship between global volume and local volumes;

wherein the network storage devices employ Internet Small Computer System Interface protocol, iSCSI protocol, a network storage device at which the primary device management unit is located has a virtual network address for receiving the access to the global volume, the redirection of the access to the global volume is implemented by iSCSI redirect protocol;

when receiving an iSCSI access request, the primary device management unit determining a global volume management unit located on a storage device for the accessed global volume according to the status information of the network storage devices, notifying the determined global volume management unit to the accessing client by using an iSCSI redirect protocol notification; the determined global volume management unit receiving another access request to the global volume initiated by the client and mapping the global volume to corresponding local volumes according to a table of mapping relationship between the global volume and local volumes.

2. The virtualized network storage system according to claim 1, wherein each of the network storage devices further comprises a data access management unit adapted to function as a communication interface for local volume accessing between different network storage devices, forward and receive an access request to local volumes located on different network storage devices sent from a global volume management unit and a result of the access request according to a predefined protocol.

3. A network storage device for use in a virtualized network storage system, comprising:
 a device management unit adapted to exchange working information of the virtualized network storage system with other device management units, redirect an access to a global volume to a network storage device adapted to execute the access to the global volume;
 wherein the working information comprises a mapping relationship between global volume and local volumes in the virtualized network storage system;
 the working information of the virtualized network storage system comprises loading parameters of network storage devices;
 the network storage device adapted to execute the access to the global volume is determined according to current loading parameters of the network storage devices;
 the network storage device employs Internet Small Computer System Interface protocol, iSCSI protocol;
 the network storage device has at least two Internet Protocol, IP, addresses, one of the IP addresses is a virtual IP address of the network storage system for a first access to a global volume in the network storage system; the other of the IP addresses is an IP address of the network storage device itself for subsequent accesses to the global volume after an iSCSI protocol redirection;
 when the device management units functions as a primary device management unit, and receiving an iSCSI access request, the primary device management unit determining a global volume management unit located on a storage device for the accessed global volume according to the working information of the network storage devices, notifying the determined global volume management unit to the accessing client by using an iSCSI redirect protocol notification, whereby, the determined global volume management unit receiving another access request to the global volume initiated by the client and mapping the global volume to corresponding local volumes according to a tab le of mapping relationship between the global volume and local volumes.

4. The network storage device for use in the virtualized network storage system according to claim 3, further comprising a data access management unit adapted to forward and receive an access request to local volumes located on different network storage devices sent from the global volume management unit and a result of the access request according to a predefined protocol.

5. A method for virtualization of a network storage system comprising at least two network storage devices, comprising:
 determining one of the at least two network storage devices as a primary network storage device;
 when receiving an access to a global volume, redirecting, by the primary network storage device, the access to the global volume to a network storage device in charge of the access to the global volume;
 executing, by the network storage device in charge of the access to the global volume, access operations to the global volume according to a mapping relationship between global volume and local volumes of the network storage devices;
 synchronizing, by the primary network storage device, the mapping relationship between global volume and local volumes which is stored on the network storage devices;
 exchanging, by the network storage devices, working status information with each other;
 determining one of the other network storage devices to take over the work of the primary network storage device when the primary network storage device has a fault;
 wherein the network storage devices employ Internet Small Computer System Interface protocol, iSCSI protocol;
 the primary network storage device has a virtual IP address of the network storage system for receiving an access to a global volume in the network storage system;
 determining one of the other network storage devices to take over the work of the primary network storage device when the primary network storage device has a fault comprises: configuring the virtual IP address, originally configured on the primary network storage device, on the network storage device taking over the work of the primary network storage device;
 determining, by the primary device management unit, a global volume management unit located on a storage device for the accessed global volume according to the working status information of the network storage devices, when receiving an iSCSI access request;
 notifying, by the primary device management unit, the determined global volume management unit to the accessing client by using an iSCSI redirect protocol notification;

receiving, by the determined global volume management unit, another access request to the global volume initiated by the client and mapping the global volume to corresponding local volumes according to a table of mapping relationship between the global volume and local volumes.

\* \* \* \* \*

UNITED STATES PATENT AND TRADEMARK OFFICE
CERTIFICATE OF CORRECTION

PATENT NO. : 8,612,561 B2
APPLICATION NO. : 12/278906
DATED : December 17, 2013
INVENTOR(S) : Xiaoke Ni It is certified that error appears in the above-identified patent and that said Letters Patent is hereby corrected as shown below:

In the Claims

In column 17, line 64, in Claim 3, delete "IP," and insert -- IP --, therefor.

In column 18, line 16, in Claim 3, delete "tab le" and insert -- table --, therefor.

Signed and Sealed this
Twenty-sixth Day of August, 2014

Michelle K. Lee
*Deputy Director of the United States Patent and Trademark Office*